Feb. 12, 1929.

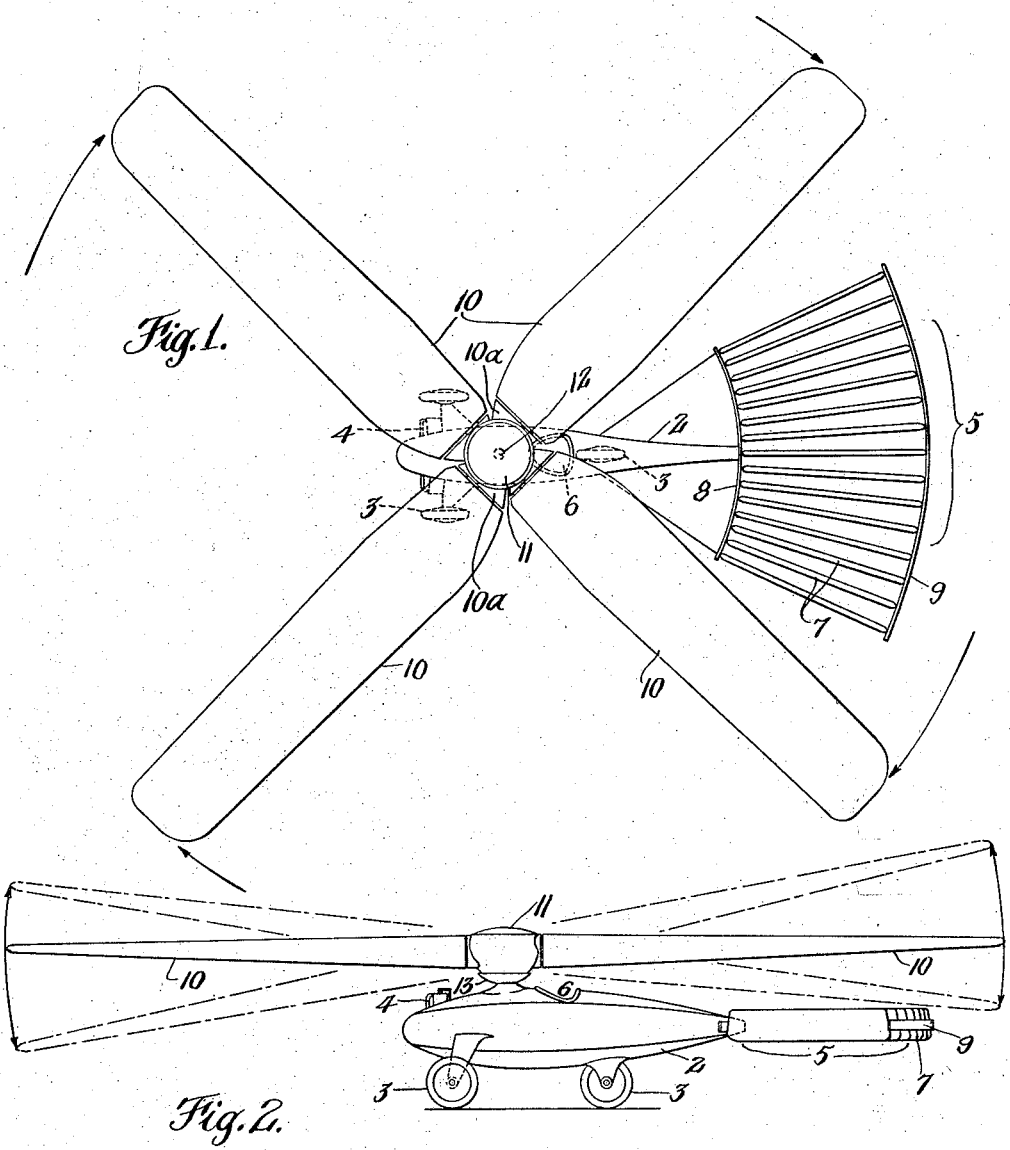

H. F. PITCAIRN 1,701,762

HELICOPTER CONTROL MECHANISM

Filed April 14, 1926  3 Sheets-Sheet 2

INVENTOR
Harold F. Pitcairn
BY
Synnestvedt + Lechner
ATTORNEYS

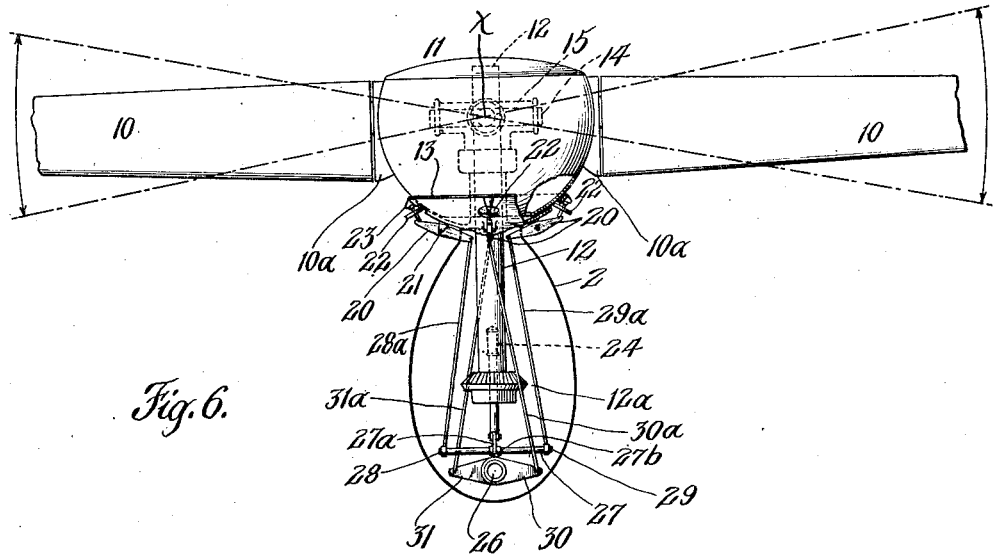
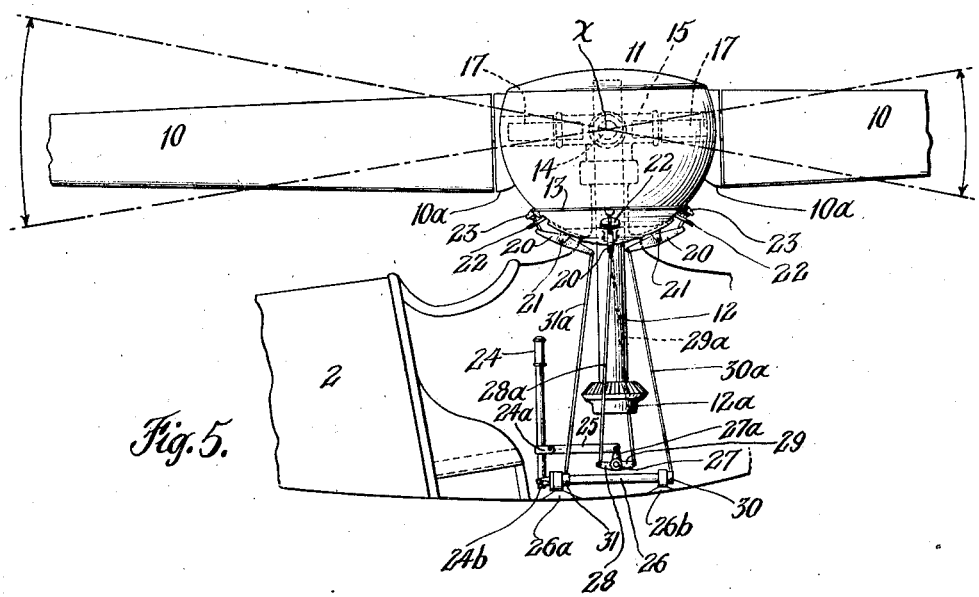

Patented Feb. 12, 1929.

1,701,762

UNITED STATES PATENT OFFICE.

HAROLD F. PITCAIRN, OF BRYN ATHYN, PENNSYLVANIA.

HELICOPTER-CONTROL MECHANISM.

Application filed April 14, 1926. Serial No. 101,992.

This invention relates to helicopter control mechanism, and particularly to mechanism for utilizing the gyroscopic action of a universally mounted, rotating set of sustaining and lifting wings or propelling blades of a helicopter to move and control the angle and direction of inclination of the axis of rotation of said lifting or propelling means, and the resultant rate of climb or descent, direction of flight, and so on, of the helicopter itself.

In the present preferred embodiment of my invention I employ a helicopter similar in general respects to that shown in my copending application, Serial No. 84,537, filed January 29, 1926, that is, one having a single propelling unit or set of rotating lifting aerofoils and equipped with anti-torque blades or vanes located within the influence of the displacement-flow of the lifting means for the counteracting of the reverse torque imparted to the helicopter by the rotation of the propelling means. In the instant case, however, I have shown such propelling means with four lifting blades or wings instead of two, although any suitable number may be employed, and I have mounted the hub of the propeller with freedom for universal motion relative to its driving shaft.

One of the primary purposes of the invention is to obtain better stability and easier control of the helicopter type of aircraft.

Another object of the invention is to make it possible to obtain the foregoing results in helicopters employing only a single lifting unit or assembly revolving in one direction, as distinguished from those machines which employ oppositely rotating elements to counterbalance torque effects, and thus to retain the advantages of the former type and at the same time obviate its disadvantages.

Still another object of the invention is to utilize the gyroscopic inertia of the revolving propelling means of a helicopter to obtain the aforementioned advantages in the control and manœuvering of such aircraft.

More specifically, my invention contemplates the provision of mechanism for controlling a helicopter, including a universally-mounted lifting unit or propeller, and means for exerting on the said propeller a force directed in such a way that the inherent gyroscopic force of the rotating propelling unit reacts to give the desired alteration in the axis of rotation of said propeller.

How I obtain, by my invention, the foregoing objects and advantages, and others which will occur to those skilled in the art, will appear more clearly hereinafter, reference being had to the accompanying drawings, wherein:

Fig. 1 is a somewhat diagrammatic plan view of a helicopter embodying my invention.

Fig. 2 is a side elevation of the same, illustrating in general the universal mounting of the lifting and propelling unit.

Fig. 5 is an enlarged fragmentary side elevation of the propelling and its universally-mounted hub, showing a convenient form of control connections in the cockpit.

Fig. 6 is a similar view taken from the front.

Figure 3:
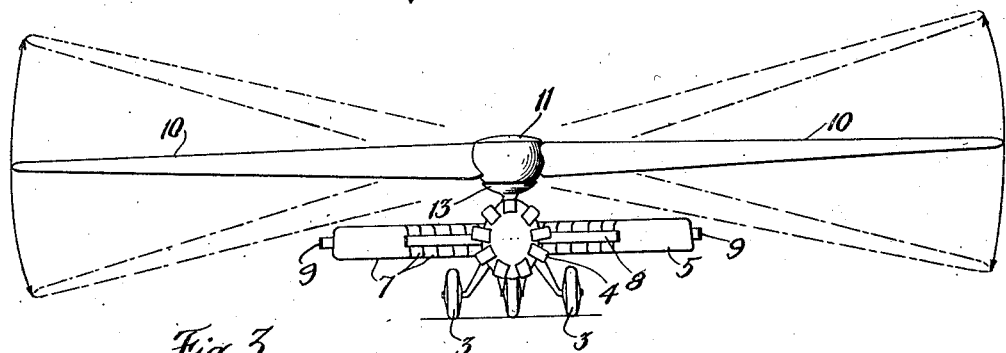
Fig. 3 is a front elevation of the same.

Referring first to Figs. 1, 2, and 3, I have therein illustrated a helicopter having a fuselage 2, landing gear 3, engine 4, tail structure 5, and cockpit 6. The tail structure 5, comprising substantially vertically-disposed vanes or fins 7, supported fore and aft by armlike members 8 and 9 extending laterally from the tail of the fuselage, forms per se no part of the present invention. This structure, however, disposed, as it is, within the influence of the slip-stream or displacement-flow of the lifting blades 10, makes possible, with the proper adjustment of the inclination of its blades 7 (as described in my aforementioned copending application), the overcoming or balancing of the torque imparted to the fuselage in the process of rotating the lifting means.

The lifting unit I have illustrated as being composed of four equi-spaced wings or aerofoils 10, mounted, for rotation in a substantially horizontal plane, on a hub member 11, which is adapted to be driven through its shaft 12, gear 12ª, and other suitable gearing (not shown) from a source of power, as the engine 4. The hub 11 is rounded beneath, so as to form a partial sphere, beneath and adjacent to which is a suitable curved shell or cup-shaped member 13 on which certain of the control parts may be mounted in juxtaposition to the spherical hub. Through this cup 13 the drive shaft 12 extends (see Figs. 3, 5 and 6), the hub being mounted for universal motion on said shaft about a point X, which point is located within the hub at its center relative to its spherical surface (see Figs. 3 and 4).

Figure 4:
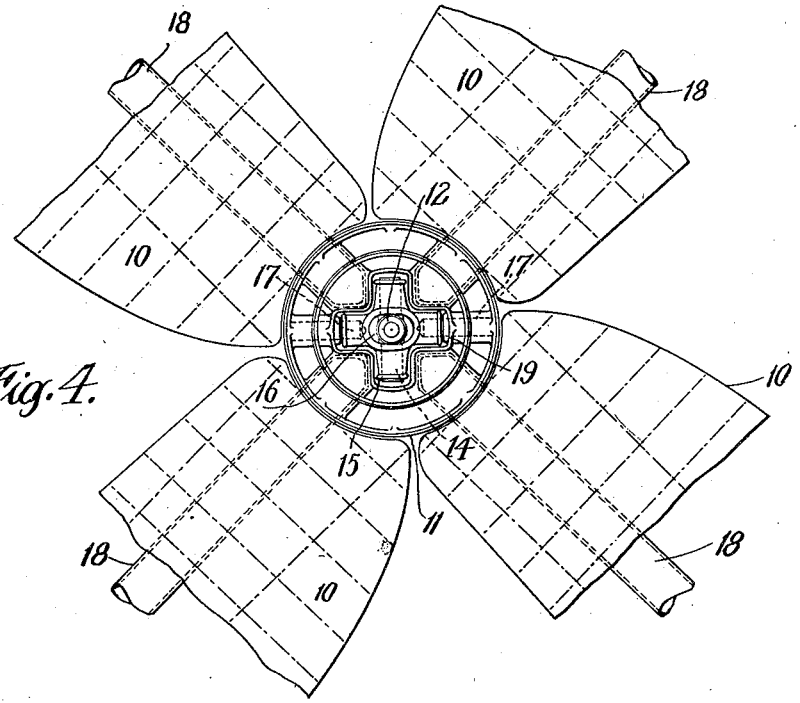
Fig. 4 is an enlarged fragmentary plan view of the lifting means with the top portion of the hub removed to show the universal mounting.

The universal mounting, as clearly disclosed in Figs. 4, 5 and 6, may comprise a pin 14 extending transversely through the drive shaft 12, a cross or spider member 15 pivotally mounted on the pin 14 and having an elongated central vertical opening 16 through which the shaft 12 may extend with freedom for relative rocking movement, and a pair of lugs or pins 17 firmly fixed on the inside of the hub 11 and extending as pivots into opposite legs of the spider 15 at right angles to the axis of the shaft mounted pin 14.

The wing-structure may comprise a set of main wing beams or longitudinal supporting members 18 mounted solidly in the hub 11 with its internal bracing structure 19, (as clearly shown in Fig. 4), and the blades 10 themselves, each of which is mounted on one of the fixed spars or beams 18. The inner end of the wing may conveniently be a separate, short stub-like member 10ª, fixed immovable to the hub (see Figs. 1, 5 and 6).

Referring now particularly to Figs. 5 and 6, it will be seen that I have therein illustrated control mechanism and connections adapted to bring about the necessary changes in the angular position of the axis of rotation of the propelling unit and to maintain any desired position of said unit relative to the fuselage. This mechanism, in the present embodiment of the invention, comprises means for exerting pressure, at will, on one or more of a plurality of points on the surface of the propeller hub 11, and includes rocking beams 20, equi-spaced around the bottom of the bowl-shaped member 13 and pivotally supported intermediate their ends, as at 21, upon the under surface of said bowl or cup, and roller members 22, each having one end pivoted at an end of a rocking beam and the other end upon a portion 23 of the cup, the periphery of the rollers being adapted to intrude through slots in the cup and to bear upon the surface of the hub. The rollers, it will be seen, are mounted to exert their pressure at an angle, relative to the radius of the curved hub surface. Otherwise their pressure would be ineffective, so far as producing a change in the position of the hub is concerned. The pressure is applied, varied, and released by the manipulation of the control stick 24, which is pivotally attached at 24ª to the reach rod 25, and at 24ᵇ to the rotatable rod 26. The other end of the rod 25 is pivotally connected to a finger or arm 27ª fastened midway of a rod 27, which latter is rotatable in the bearing 27ᵇ. On the right and left ends, respectively, of said rod 27 are mounted cranks or arms 28 and 29 connected by suitable rods 28ª and 29ª, respectively, to the right and left rocking members 20. The rod 26, mounted for rotation in the bracket supports or bearings 26ª and 26ᵇ, carries left and right laterally extending cranks or arms 30 and 31, connecting, through the rods 30ª and 31ª respectively, to the fore and aft rockers 20.

In operation, it will be apparent that, since the effect of an impressed force acting about any one axis of a rapidly revolving body is to cause gyroscopically an angular movement about an axis substantially at right angles thereto, the force exerted must be in a direction at right angles to that in which it is desired to move the propeller. For example, if it be desired to tilt the axis of rotation forwardly to produce translational motion of the machine in a desired direction (in addition to the hovering or simple sustaining of it), it is necessary to apply the pressure laterally. In other words, the force is exerted in such a way that the inherent gyroscopic force of the rotating element reacts to give the desired alteration in its axis of rotation.

It is to be understood that gyroscopic control in accordance with my invention may be utilized in an aircraft employing any number of lifting or sustaining propellers arranged co-axially or side by side or otherwise, and that two or more may be inclined with respect to one another for the purpose of securing dihedral angle effects either longitudinally of the craft or laterally, and I do not wish to be understood as limiting my invention to application to a single propelling unit, or to the particular type of aircraft shown in the present embodiment of the invention.

I claim:—

1. In helicopter control mechanism, the combination of a universally mounted rotary propelling and sustaining unit and means adapted to utilize the gyroscopic force set up in said unit to control its angular position with relation to the helicopter.

2. In helicopter control mechanism, the combination of a universally mounted rotary propelling and sustaining unit, driving means therefor, and means adapted to utilize the gyroscopic inertia of the rotating unit to control its angular position on its universal mounting.

3. In aircraft apparatus of the character described, a drive-shaft, a hub mounted thereon with freedom for universal motion relative thereto, a plurality of propelling and sustaining blades mounted on said hub, and pressure-exerting means mounted on the aircraft and adapted to bear against said hub.

4. In combination with a helicopter and its fuselage, a universally mounted rotary lifting and sustaining propeller, an anti-torque aerofoil disposed within the influence of the displacement flow of said propeller and adapted to counteract thereby the rotational movement set up in the fuselage, and means adapted to utilize the gyroscope force set up in the rotating propeller to control the angular position of the axis of rotation thereof with relation to the fuselage.

5. In combination with a helicopter and its fuselage, a universally mounted rotary lifting and sustaining propeller, an anti-torque aerofoil disposed within the influence of the displacement flow of said propeller and adapted to counteract thereby the rotational movement set up in the fuselage, and means adapted to control the angular position of the axis of rotation of the propeller with relation to the fuselage, said means comprising apparatus for imparting pressure to said rotating propeller about an axis substantially at right angles to the axis about which it is desired to move the propeller's angular position.

6. Aircraft control mechanism comprising, in combination with a helicopter having rotating propelling and sustaining means and driving means therefor, a shaft actuated by said driving means, a hub member mounted on said shaft for rotation therewith with freedom for universal motion relative thereto and having said propelling and sustaining means mounted thereon, and means mounted on the aircraft and adapted to exert pressure on said rotating hub.

7. In aircraft apparatus of the character described, in combination with a driving means and a driveshaft, a hub having a universal joint therein and adapted to be driven by said shaft through said joint, propelling and sustaining blades mounted on the hub, said hub having at least a portion of its outer surface spherical in shape with the center of the universal joint as the center of the spherical surface; together with means for exerting pressure at a plurality of points on the spherical surface of the hub.

8. In aircraft apparatus of the character described, in combination with a driving means and a drive-shaft, a hub having a universal joint therein and adapted to be driven by said shaft through said joint, propelling and sustaining blades mounted on the hub, said hub having at least a portion of its outer surface spherical in shape with the center of the universal joint as the center of the spherical surface; together with means for exerting pressure at a plurality of points on the spherical surface of the hub, said means including a plurality of spaced rollers mounted on the aircraft and adapted to bear against the surface of the hub.

9. In aircraft apparatus of the character described, in combination with a driving means and a driveshaft, a hub having a universal joint therein and adapted to be driven by said shaft through said joint, propelling and sustaining blades mounted on the hub, said hub having at least a portion of its outer surface spherical in shape with the center of the universal joint as the center of the spherical surface; together with means for exerting pressure at a plurality of points on the spherical surface of the hub, said means comprising a cup-shaped member mounted on the aircraft, the inside of said cup fitting the spherical surface of the hub with freedom for relative rotational movement, said cup-shaped member having openings therethrough, rockers mounted on the outside of the cup, control connections to said rockers, and rollers rockingly mounted on the cup and intruding through said openings therein and adapted to be actuated by said rockers to bear against the surface of the hub.

10. In aircraft apparatus of the character described, in combination with a driving means and a driveshaft, a hub having a universal joint therein and adapted to be driven by said shaft through said joint, propelling and sustaining blades mounted on the hub, said hub having at least a portion of its outer surface spherical in shape with the center of the universal joint as the center of the spherical surface; together with means for exerting pressure at a plurality of points on the spherical surface of the hub, said means including rollers each mounted to bear on said spherical surface, the radial line of the roller being at an angle with relation to the radial line through the spherical surface at the point of bearing.

11. In an aircraft, the combination of a universally mounted rotatable propeller and means adapted to utilize the gyroscopic force set up by its rotation to control its angular position with relation to the aircraft.

In testimony whereof I have hereunto signed my name.

HAROLD F. PITCAIRN.